US008787396B2

(12) United States Patent
Anantharam et al.

(10) Patent No.: US 8,787,396 B2
(45) Date of Patent: Jul. 22, 2014

(54) CENTRALIZED CONTROL AND MANAGEMENT PLANES FOR DIFFERENT INDEPENDENT SWITCHING DOMAINS

(71) Applicant: International Business Machines Corporation, Armonk, NY (US)

(72) Inventors: Sushma Anantharam, Cupertino, CA (US); Nirapada Ghosh, Sunnyvale, CA (US); Keshav G. Kamble, Fremont, CA (US); Dar-Ren Leu, San Jose, CA (US); Chandarani J. Mendon, San Jose, CA (US); Vijoy A. Pandey, San Jose, CA (US); Nandakumar Peethambaram, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/644,260

(22) Filed: Oct. 4, 2012

(65) Prior Publication Data

US 2014/0098820 A1 Apr. 10, 2014

(51) Int. Cl.
*H04L 12/28* (2006.01)
(52) U.S. Cl.
USPC ........... 370/401; 370/400; 370/466; 370/389; 370/252; 370/236.2; 709/230
(58) Field of Classification Search
None
See application file for complete search history.

(56) References Cited

U.S. PATENT DOCUMENTS

| | | | | |
|---|---|---|---|---|
| 5,933,412 A | * | 8/1999 | Choudhury et al. | 370/218 |
| 6,549,536 B1 | * | 4/2003 | Pavesi et al. | 370/395.31 |
| 2003/0099254 A1 | * | 5/2003 | Richter | 370/466 |
| 2003/0128911 A1 | | 7/2003 | Ravikanth et al. | |
| 2009/0245236 A1 | | 10/2009 | Scott et al. | |
| 2010/0061394 A1 | | 3/2010 | Sindhu et al. | |
| 2011/0032944 A1 | | 2/2011 | Elzur et al. | |
| 2012/0027018 A1 | * | 2/2012 | Ilyadis | 370/392 |
| 2012/0155453 A1 | * | 6/2012 | Vohra et al. | 370/352 |

OTHER PUBLICATIONS

Keshav, S et al., "Issues and Trends in Router Design", IEEE Communications Magazine, May 1998, pp. 144-151.
Chen, T. M. et al, "Managment and Control Functions in ATM Switching Systems", IEEE Network, Jul./Aug. 1994, pp. 27-40.
Eddington,C., "InfiniBridge: an InfiBand Channel Adapter with Integrated Switch", IEEE Micro, Mar./Apr. 2002, pp. 48-56.

* cited by examiner

*Primary Examiner* — Duc C Ho
(74) *Attorney, Agent, or Firm* — Schmeiser, Olsen & Watts LLP; Michael Rodriguez

(57) ABSTRACT

A network includes a first switching domain having a distributed fabric comprised of interconnected standalone switches. The standalone switches communicate with each other in accordance with a packet-based distributed fabric protocol. A second switching domain has a plurality of cell-based switches in communication with a cell-based switch fabric. The cell-based switches communicate with each other through the cell-based switch fabric in accordance with a cell-based distributed fabric protocol. One of the cell-based switches is coupled by a communication link to one of the standalone switches of the first switching domain. The second switching domain includes a server device coupled to one of the cell-based switches. The server device is configured with logic to process control packets for the standalone switches in accordance with the packet-based distributed fabric protocol and control packets for the cell-based switches in accordance with a protocol that is different from the packet-based distributed fabric protocol.

25 Claims, 8 Drawing Sheets

CENTRALIZED CONTROL AND MANAGEMENT PLANES FOR DIFFERENT INDEPENDENT SWITCHING DOMAINS

FIELD OF THE INVENTION

The invention relates generally to data centers and data processing. More particularly, the invention relates to centralizing control of the management and control planes for different independent switching domains.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. A given data center can be made of different types of switching domains. One type of switching domain can comprise a group of standalone packet-based switches integrated to form a single virtual switch. Another type of switching domain can comprise a group of cell-based switches managed through a single management domain. Traditionally, managing the switches of a data center with different independent switching domains has been complex.

SUMMARY

In one aspect, the invention features a network including a first switching domain having a distributed fabric comprised of a plurality of interconnected standalone switches. The standalone switches communicate with each other in accordance with a packet-based distributed fabric protocol. A second switching domain has a plurality of cell-based switches in communication with a cell-based switch fabric. The cell-based switches of the second switching domain communicate with each other through the cell-based switch fabric in accordance with a cell-based distributed fabric protocol. A given one of the cell-based switches of the second switching domain is coupled by a communication link to a given one of the standalone switches of the first switching domain. The second switching domain further includes a server device coupled to one of the cell-based switches in the second switching domain. The server device is configured with logic to process control packets for the standalone switches of the first switching domain in accordance with the packet-based distributed fabric protocol and control packets for the cell-based switches of the second switching domain in accordance with a protocol that is different from the packet-based distributed fabric protocol.

In another aspect, the invention features a server computing system comprising memory storing program code for providing control plane functionality for a first switching domain comprised of a plurality of interconnected standalone packet-based switches that communicate with each other in accordance with a packet-based distributed fabric protocol and program code for providing control plane functionality for a second switching domain having a plurality of cell-based switches that communicate with each other through a cell-based switch fabric in accordance with a cell-based distributed fabric protocol. A processor executes the program code stored in the memory to process control packets for the standalone switches of the first switching domain in accordance with the packet-based distributed fabric protocol and control packets for the cell-based switches of the second switching domain in accordance with a protocol that is different from the packet-based distributed fabric protocol.

In still another aspect, the invention features a method for centralizing control plane functionality for heterogeneous switching domains. The method comprises configuring a server device with logic for processing control packets for standalone switches of a first switching domain in accordance with a packet-based distributed fabric protocol and with logic for processing control packets for cell-based switches of a second switching domain in accordance with a protocol that is different from the packet-based distributed fabric protocol. The server device is coupled to a cell-based switch of the cell-based switching domain. The server device processes control packets for the standalone switches of the first switching domain in accordance with the packet-based distributed fabric protocol and control packets for the cell-based switches of the second switching domain in accordance with the protocol that is different from the packet-based distributed fabric protocol.

In yet another aspect, the invention features a computer program product for execution by a server device to provide control plane and management plane functionality for different heterogeneous switching domains. The computer program product comprises a computer-readable storage medium having computer-readable program code embodied therewith. The computer-readable program code comprises computer-readable program code configured to enable the server device to process control packets for standalone switches of a first switching domain in accordance with a packet-based distributed fabric protocol used by the standalone switches to communicate in the first switching domain. The computer-readable program code further comprises computer-readable program code configured to enable the server device to process control packets for cell-based switches of a second switching domain in accordance with a protocol that is different from the packet-based distributed fabric protocol.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Distributed fabric systems described herein bring multiple independent switching domains, each traditionally having its own management domain, under a single management domain. One type of switching domain, referred to as a packet-based distributed fabric, has a plurality of interconnected standalone switches. In general, a packet-based distributed fabric includes a master switch, a standby switch, and follower switches. The master switch communicates with each follower switch in accordance with a distributed fabric protocol.

Another type of switching domain, referred to herein as a cell-based distributed fabric, has a plurality of cell-based switches in communication with a cell-based switch fabric, which forwards cells among the cell-based switches of the cell-based distributed fabric in accordance with a cell-based distributed fabric protocol. One of the cell-based switches of the cell-based switching domain is coupled to one or more of the standalone switches of the packet-based distributed fabric.

To bring the heterogeneous switching domains under a single management domain, a server device (i.e., computing system) centrally runs the control and management planes of both the packet-based and cell-based distributed fabrics. The server device is part of the cell-based distributed fabric, coupled to a network-facing port of one or more of the cell-based switches. In addition, this server device is configured with logic that effectively incorporates the cell-based distributed fabric into the packet-based distributed fabric as a "virtual" standalone switch. This virtual standalone switch can assume a master switch role of the packet-based distributed fabric or it can operate as one of the follower switches of the packet-based distributed fabric. The server device processes the control and/or management packets for the packet-based distributed fabric in accordance with the distributed fabric protocol by which the master and follower switches communicate. To process the control and/or management packets of the cell-based distributed fabric, the server device employs a communication protocol different from the distributed fabric protocol employed by the packet-based distributed fabric.

Running the control and management planes on the server device, instead of on one of the standalone switches, advantageously reduces the computing load on that standalone switch, a burden that would normally increase with increases in port density on the switches and when grouping multiple standalone switches into a single packet-based distributed fabric. Similarly, centralizing the control and management planes on the server device alleviates the computing load on the individual cell-based switches of the cell-based distributed fabric.

Figure 1:
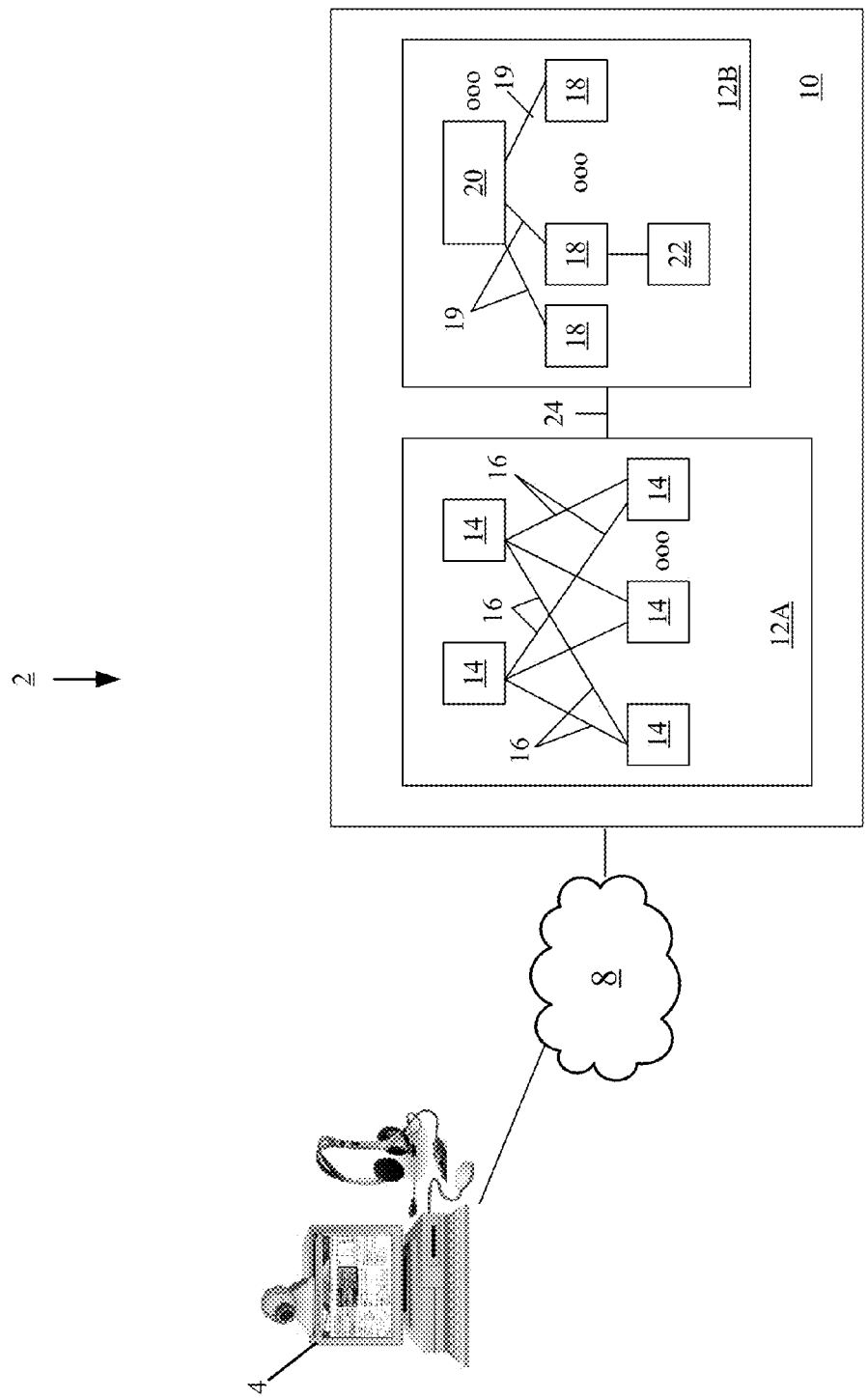
FIG. 1 is an embodiment of a networking environment including a data center with a plurality of independent switching domains brought under a single management domain.

FIG. 1 shows an embodiment of a networking environment 2 including a data center 10 in communication with a management station 4 over a network 8. Embodiments of the network 8 include, but are not limited to, local-area networks (LAN), metro-area networks (MAN), and wide-area networks (WAN), such as the Internet or World Wide Web. In one embodiment, the network 8 is configured as an Layer 2 (L2) VLAN.

In general, the data center 10 is a facility that houses various computers, routers, switches, and other associated equipment in support of applications and data that are integral to the operation of a business, organization, or other entities. The equipment of the data center 10 may be deployed at a single site or distributed among multiple sites. The data center 10 includes a plurality of independent heterogeneous switching domains 12A, 12B (generally, 12) connected to each other by one or more communication links 24. As used herein, a switching domain 12 includes a plurality of network elements configured together to cooperate as a single distributed fabric system, as a virtual switch, or as a stacked switch.

One embodiment of the switching domain 12A includes a group of independent (standalone) packet-based switches 14 in communication over inter-switch links (ISLs) 16. In general, a defined group of standalone packet-based switches has a master (or controller) switch, one or more standby or backup switches, and one or more follower switches, as described in more detail in connection with FIG. 2. Although only five switches 14 are shown, the number of switches in the packet-based switching domain 12A can range in the hundreds and thousands. Embodiments of the switches 14 include, but are not limited to, core switches, access switches, fabric cards, line cards, and management modules in a physical chassis switch.

One embodiment of the switching domain 12B includes a group of cell-based switches 18 in communication with one or more scaled-out fabric coupler (SFC) chassis 20 over communication links 19. Each SFC chassis 20 has one or more cell-based switch fabric elements (not shown) for switching cells among the switches 18, as described in more detail in connection with FIG. 4. The one or more SFC chassis 20 provide a cell-based switching fabric for the switches 18.

In the data center 10, the functionality occurs on three planes: a management plane, a control plane, and a data plane. The management of a group, such as operations, administration, and management (OAM), configuration management, presentation of information (show and display), graph generation, and handling SNMP requests, occurs on the management plane. The control plane is associated with those functions involving network signaling and control. The data plane manages data flow. In the data center 10, the functionality of the management plane and/or control plane of both the packet-based and cell-based switching domains 12A, 12B is centrally implemented at a server 22, as described further herein. The functionality of the data plane is distributed among the packet-based and cell-based switches 14, 18, respectively.

The server 22 is connected to one of the switches 18 of the cell-based switching domain 12B. In general, the server is a device or computer (or group of computers) that provides one or more services to the data center 10, examples of which include, but are not limited to, email servers, proxy servers, DNS servers. Preferably, the server 22 is a control server configured to run the control plane and/or management plane of a distributed fabric system comprised of multiple heterogeneous switching domains.

The management station 4 provides a centralized point of administration for managing and controlling the switches 14 of the packet-based switching domain 12A and the cell-based switches 18 and SFC chassis 20 of the cell-based switching domain 12B. Through the management station 4, a user or network administrator of the data center 10 communicates with the server 22 in order to manage the different switching domains 12A, 12B, which are thus brought together under a single management domain. A graphical user interface (GUI) application executing on the management station 4 can serve to provide the network administrator with a view of the entire network topology of the different switching domains 12A, 12B. An example of such a GUI application is Blade Harmony Manager® provided by IBM Corporation of Armonk, N.Y. Although shown outside of the data center 10, the management station 4 may be considered part of the data center 10.

In addition, the management station 4 can connect directly (point-to-point) or indirectly to one of the switches 14, 18, or to the server 22, over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet or SNMP (Simple Network Management Protocol), the management station 4 can access a command-line interface of a given switch 14, 18 or the central control and/or management planes of the multi-switching domain distributed fabric system at the server 22. To support the management and control plane functionality of the multi-switching domain distributed fabric system, the server 22 is configured with sufficient processing power (e.g., with multiple processor cores) and certain logic, as described in more detail below.

Figure 2:
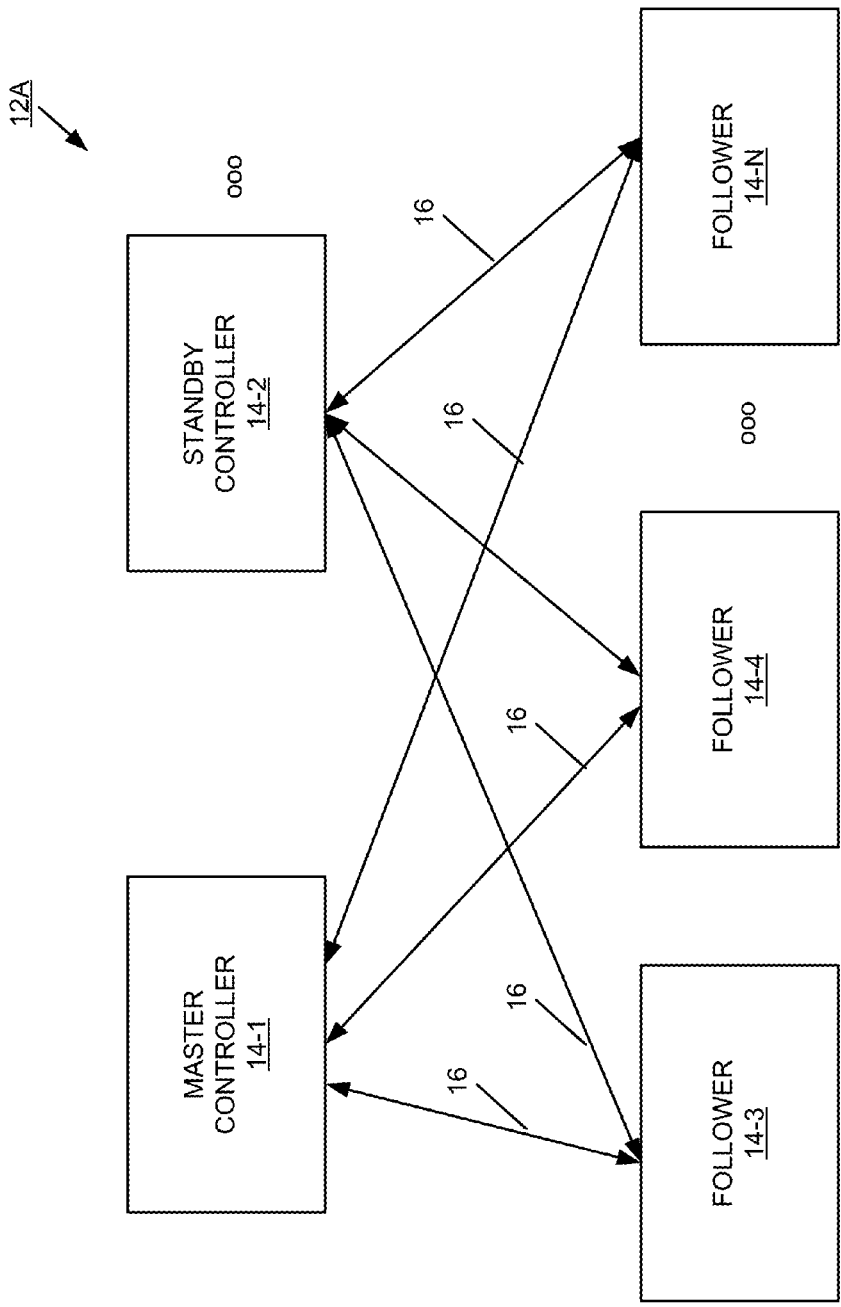
FIG. 2 is a block diagram of an embodiment of a packet-based switching domain including a master (controller) switch, a backup switch, and a plurality of follower switches.

FIG. 2 shows an embodiment of the packet-based switching domain 12A with the plurality of standalone switches 14-1, 14-2, 14-3, 14-4, 14-N. In general, in a distributed fabric system such as switching domain 12A, one of the switches is chosen as a master (controller) switch, another switch is designated as a backup (standby) switch, and all other switches are follower switches. The master switch is, in general, the control center for the switching domain, and a follower switch is any network element under the control of the master switch. The master switch handles external management requests and routes the requests internally within the switching domain.

In FIG. 2, for example, the switch 14-1 is a master switch, the switch 14-2 is a standby switch, and switches 14-3, 14-4, 14-N are follower switches. The master switch 14-1 and standby switch 14-2 are each in communication with each of the follower switches 14-3, 14-4, 14-N over ISLs 16. Other interconnection configurations can be employed, including, but not limited to, a daisy chain, full mesh, star, and stacked, without departing from the principles described herein. In one embodiment, the ISLs 16 over which the switches communicate are 10 Gb Ethernet links (i.e., the switches 14 are Ethernet switches that communicate according to an Ethernet standard protocol, for example, the IEEE 802.Qgb standard).

Under normal operation of the switching domain 12A, the standby switch 14-2 operates like a follower switch, except that the standby switch 14-2 assumes master ownership should the current master switch fail. The master switch 14-1 is considered to have a master-follower relationship with each of the follower switches 14-2, 14-3, 14-4, 14-N. In a master-follower relationship, the master switch 14-1 sends management and/or control to and receives responses from follower switches.

Figure 3:
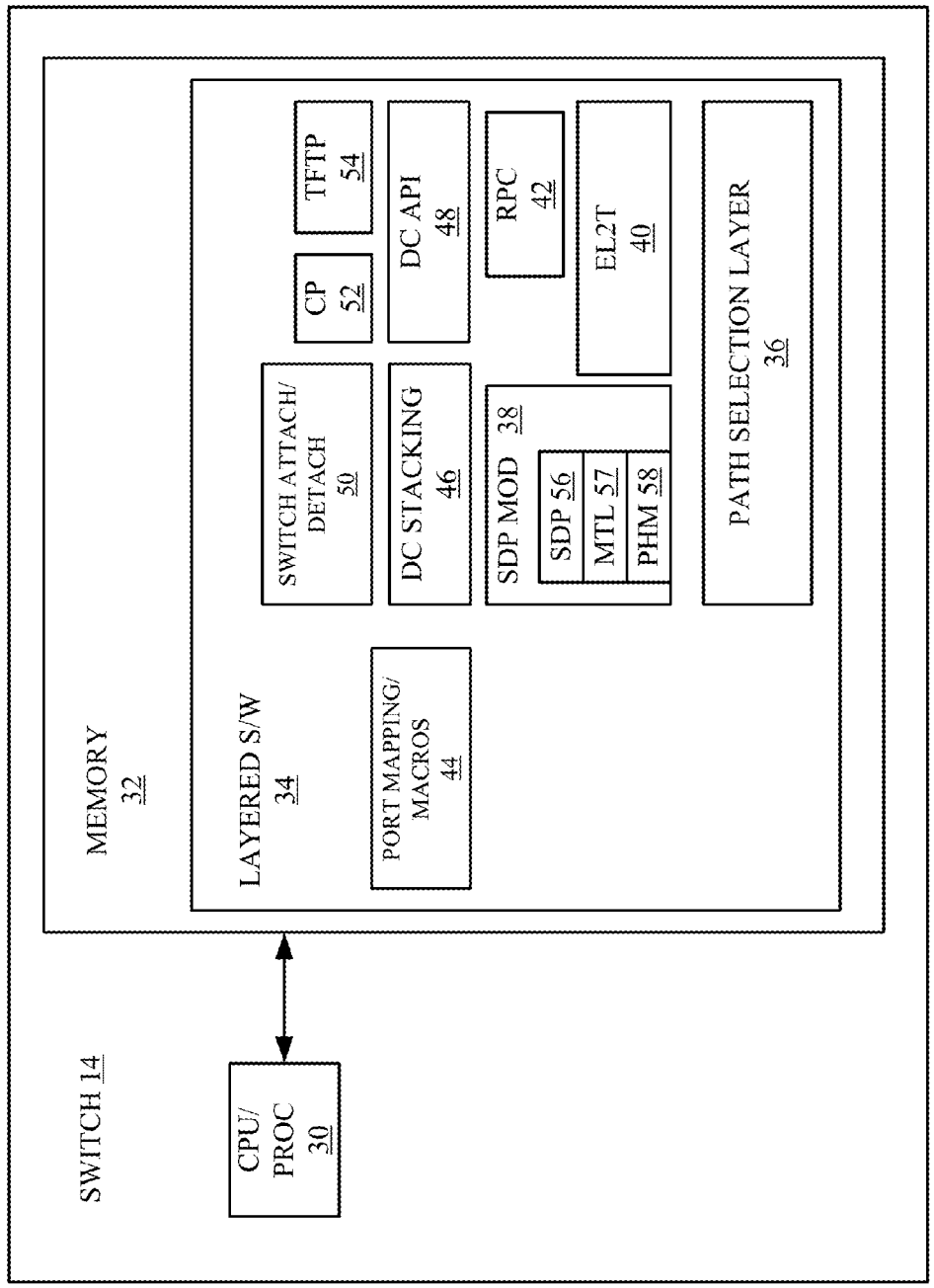
FIG. 3 is a functional block diagram of an embodiment of a switch in the packet-based switching domain, the switch including a processor in communication with memory, and layered software stored in the memory.

FIG. 3 shows a simplified embodiment of a standalone packet-based switch 14, including a processor 30 in communication with memory 32, and layered software 34 stored in the memory 32. The layered software 34 includes a set of software components common to each of the switches 14. In brief, the set of software components includes protocols for grouping the multiple switches 14 together to form a single large switch. By implementing the protocols provided by this set of software components, referred to herein as M-DFP or Management Distributed Fabric Protocol, the group of switches can be configured to cooperate and be centrally managed as a stacked switch, a virtual switch, or a distributed chassis switch. This set of software components can also serve to implement a physical chassis switch.

In general, the M-DFP software components reside in the software stack 34 between those applications on the switch 14 and the SDK (software development kit) on a system. An SDK includes runtime tools, such as the Linux kernel, development tools, software libraries, and frameworks. The switch 14 also includes one or more switching chips (not shown) for routing packets throughout the packet-based switching domain 12A. The layered software stack 34 includes a path selection layer 36, a switch discovery protocol (SDP) module 38, an EL2T (Ethernet-based L2 Transport) layer 40, an RPC (Remote Procedure Call) module 42, a port mapping/macros module 44, a DC (device configuration)-stacking module 46, DC APIs (application program interface) 48, a switch attach/detach module 50, a CP (check point) module 53, and a TFTP (Trivial File Transfer Protocol) module 54. The communications required to implement M-DFP in the switch 14 can run on top of standard Ethernet links, a fabric connection, or any proprietary bus.

The path selection layer (PSL) 36 facilitates CPU-to-CPU communications in support of the SDP and EL2T modules 38, 40. In the layered software stack 34, the SDP module 38 is disposed between the DC-stacking module 46 above and the PSL 36 below. The SDP module 38 and the PSL 36 cooperate to determine the egress port by which a packet is sent from the switch to a remote switch. The PSL 36 includes a driver interface to both socket and data ports.

The SDP module 38 discovers when switches join and leave the group, referred to as switch-found and switch-gone events, respectively. Detecting the departure of a switch 14 can be achieved using an age-out mechanism. Link-down events on the ISLs 16 can also trigger switch-gone detection under some conditions. The SDP module 38 reports switch-found (JOIN_STACK) and switch-gone (LEAVE_STACK) events to the DC-stacking module 36 on the same network element for further processing. Other functions of the SDP module 38 are to check the health of ISLs 16 for all possible paths between the local network element and other remote network elements, and to provide a priority-based master-election mechanism.

The SDP module 38 includes a switch discovery protocol (SDP) 56, a member tracking layer (MTL) 57, and a Path Health Maintenance (PHM) component 58. SDP 56 is a multicast protocol, running in a common L2 VLAN, used for discovery of switches in the switching domain 12A. After a switch 14 receives a packet for SDP, related switch information is passed into the MTL 57 for maintenance of membership. Such packets are referred to as switch discovery protocol data units or SDPDUs.

The MTL 57 is a database layer of the SDP module 38 for tracking the current network element members in the same group and for maintaining switch information for all such members. The switch information for each switch 14 includes: the switch number, the MAC address of the switch, switch information (SI) and switch member (SM) sequence numbers, and a timestamp of the last SDPDU received from a remote network element. Any changes to the switch information is reported to MTL 14 for tracking. When an ISL 16 goes down, the switch information learned over that link is cleared in the MTL 57. To help detect a switch-gone event, the MTL 57 implements an age-out mechanism, using timers to "age out" a remote network element if no SDPDU is received from that network element for a specified duration. The MTL 57 also elects the master switch 14-1 of a group based on switch priorities (carried in the SDPDUs of the switches 14). After the election, the elected master switch 14-1 reports the switch member information to the DC-stacking module 46 of the master switch 14-1. In addition, the MTL 57 of the master switch 14-1 passes a message to the DC-stacking module 46 to notify of any change in switch membership in the group, whether resulting from a newly discovered switch or a from detecting a switch departure.

The PHM component 58 of the SDP module 38 maintains the health states of all possible paths between the (local) switch 14 and all other remote switches. When an SDPDU is received from a remote switch 14, the health states for that switch are also updated in the MTL 57. The EL2T 40 and PSL 36 use this health information to determine the path or port used for communication between the local switch and a remote switch.

The EL2T layer 40 provides a simple L2 transport protocol to facilitate communications by the upper layer protocols above the EL2T layer 40. In one embodiment, these upper layer protocols include the RPC module 42, the DC-stacking module 46, the CP module 52, the TFTP module 54, and all applications on the switch 14. The RPC module 42 provides an RPC mechanism that is based on EL2T layer 40, and used by DC-API layer 48 on the master switch 14-1 to communicate with a remote switch.

The port mapping/macros module 44 provides applications on the top of the layered software with a mapping from a global CLI port to a physical device and a port. In cooperation with the DC-stacking module 36 and the SDP module 38, the port mapping/macros module 44 maintains the mapping.

The DC-stacking module 46 uses data structures to form a "stack" of the switches 14 in the same group, coordinating the switches such that they cooperate as a single switch. The DC-stacking module 46 of all switches in the same group communicates with each other using the EL2T module 40 for information exchange and for stack formation. In addition, the DC-stacking module 46 on different network elements work together to make sure the master switch 14-1 has up-to-date information for existing switches (through HOST-UPDATE events). A HOST-UPDATE event is passed to the DC-stacking module 46 to provide an information update whenever the switch information for a given switch has changed and the DC-stacking module 46 has already received a JOIN-STACK event for that given network element.

Through the DC-API layer 48, applications running on the switch 14 can make program calls to the hardware switching chips of the switch 14, either to retrieve information from the chips or to set some parameters on the chips. These chips may reside either on the local switch or on a remote switch.

The switch attach/detach module 50 notifies applications on the switch 14 of changes on the switch, thus providing applications at the top of the layered software stack 34 with a global view of all data ports on all network elements in the group.

The CP module 52 assists applications running on the master switch 14-1 to synchronize each relevant database and states with the standby switch 14-2 in preparation for a backup-to-master failover.

The TFTP module 54 provides a transport layer on top of the EL2T layer 40 to assist the DC-stacking module 46 and applications to push either a configuration or a firmware image from the master switch 14-1 to any follower switch 14-3, 14-4, 14-N.

In brief overview, after becoming master of the packet-based switching domain 12A, the master switch 14-1 is in discovery mode, wherein the master switch 14-1 discovers the various followers that are in the packet-based switching domain 12A. The follower switches 14-2, 14-3, 14-4, 14-N send their switch information to the master switch 14-1. The master switch 14-1 generates a virtual slot for each follower, which joins that follower to the stack switch and generates their master-follower relationship.

During the operation of the packet-based switching domain 12A, the master-follower relationship governs the execution of various management and control plane functionality, such as performing switch configurations, collecting information, upgrading firmware, and performing diagnostics, as described in U.S. patent application Ser. No. 13/364,896, titled "Distributed Fabric Management Protocol", and Ser. No. 13/364,947, titled "Switch Discovery Protocol for a Distributed Fabric System", the entireties of which applications are incorporated by reference herein. As described in more detail below, the management and control plane functionality is centralized at the server device 22 (FIG. 1), rather than implemented at any one standalone switch 14 (e.g., at the master switch 14-1) or distributed among the various standalone switches. M-DFP management packets and M-DFP control packets are forwarded to this server device 24 for processing.

Figure 4:
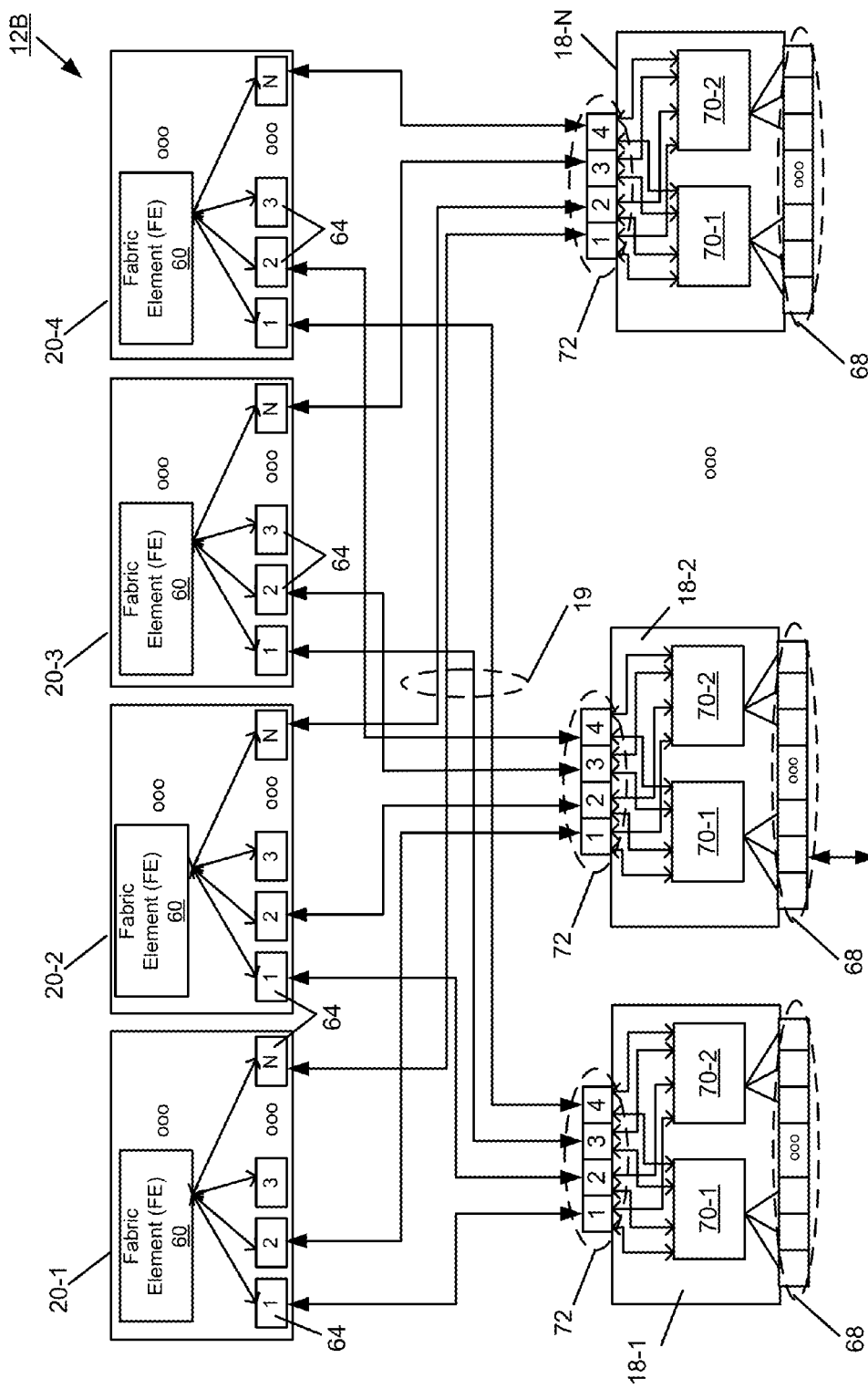
FIG. 4 is a block diagram of an embodiment of a cell-based switching domain including a plurality of scaled-out fabric coupler (SFC) chassis interconnected with a plurality of switches.

FIG. 4 shows an example embodiment of the cell-based switching domain 12B having four independent SFC chassis 20-1, 20-2, 20-3, and 20-4 (generally, 20) in communication with a plurality of cell-based switches 18-1, 18-2, 18-N (generally, 18). The number, N, of switches 18 can range in the hundreds and thousands. Each SFC chassis 20 includes a set of cell-based switch fabric elements (FE) 60 in communication with N SFC fabric ports 64, there being at least as many SFC fabric ports 64 in each SFC chassis 20 as the number of switches 18 in the switching domain 12B. Each set of fabric elements 60 corresponds to a CLOS of fabric elements of an SFC chassis 20 that switches cells between fabric ports 64 based on the destination information in the cell header.

Each switch 18 has network-facing ports 68, network processors 70-1, 70-2 and fabric-facing ports 72. The network-facing (or network) ports 68 can be in communication with servers (e.g., the server device 22), with external switching domains (e.g., switching domain 12A), and with the network 8 (FIG. 1), for example, the Internet. In one embodiment, each switch 18 has forty network ports 68, with each of the network ports 68 being configured as a 10 Gbps Ethernet port (the aggregate network bandwidth of the switch 18 is 400 Gbps) that receives Ethernet packets.

In this example, the switching domain 12B has a full-mesh configuration: each switch 18 is in communication with each of the SFCs 20; more specifically, each of the fabric-facing ports 72 (hereafter, switch fabric port 72) of a given switch 18 is in electrical communication with an SFC fabric port 64 of a different one of the SFCs 20 over a communication link 19. Referring to the switch 18-1 as a representative example, the switch fabric port 72-1 of the switch 18-1 is in communication with the fabric port 64-1 of the SFC 20-1, the switch fabric port 72-2 with the SFC fabric port 64-1 of the SFC 20-2, the switch fabric port 72-3 with the SFC fabric port 64-1 of the SFC 12-3, and the switch fabric port 72-4 with the SFC fabric port 64-1 of the SFC 20-4. Connected in this full-mesh configuration, the switches 18 and SFCs 20 form a distributed virtual chassis, with the switches 18 acting as line cards. As an example, four 256-fabric port SFC chassis 20 together can connect up to 256 switches 18. Such a distributed virtual chassis is modular; that is, switches 18 can be added to or removed from the distributed virtual chassis, one at a time, like line cards added to or removed from a physical chassis.

The communication link 19 between each switch fabric port 72 and an SFC fabric port 64 can be a wired connection.

Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 19 can be a direct physical connection (i.e., electrical connectors of the switch fabric ports 72 physically connect directly to electrical connectors of the SFC fabric ports 64).

During operation of the switching domain 12B, packets arrive at the network ports 68 of the switches 18. For each received packet, one of the network processors 70 of the switch 18 adds metadata/pre-classification header to the packet. The network processor 70 then partitions the packet into one or more fixed-size cells (e.g., 256 bytes). The network processor 70 sends the cells out through the switch fabric ports 72 to each of the SFCs 20, sending different cells to different SFCs 20. For example, consider an incoming packet with a length of 1600 bytes. The receiving network processor 70 of the switch 18 can split the packet into four cells of 400 bytes (before adding header information—e.g., 10 bytes—to those cells). The network processor 70 then sends a different cell to each of the four SFCs 20, in effect, achieving a load balancing of the cells across the SFCs 20.

In each SFC 20, a cell-based switch fabric element 60 receives a cell and examines the header of that cell, determines its destination, and sends the cell out through the appropriate one of the SFC fabric ports 64 of that SFC to the destination switch 18. The destination switch 18 receives all cells related to the original packet from the SFCs 20, reassembles the original packet (i.e., removing the added headers, combining cells), and sends the reassembled packet out through the appropriate one of its network ports 68. Continuing with the previous four-cell example, consider that each SFC determines that the destination switch 18 is switch 18-2. Each SFC 20 sends its cell out through its fabric port 64-2 to the switch 18-2. The switch 18-2 reassembles the packet from the four received cells (the added headers providing an order in which to combine the cells) and sends the packet out of the appropriate network port 68. The pre-classification header information in the cells determines the appropriate network port 68.

The full-mesh configuration of FIG. 4, having the four SFC chassis 20, is a full-line rate configuration, that is, the aggregate bandwidth for transmitting cells from a given switch 18 to the SFCs (i.e., 480 Gbps) is greater than the aggregate bandwidth of packets arriving at the given switch 18 on the network ports 68 (i.e., 400 Gbps). The configuration can also be adapted to support various oversubscription permutations for switches 18. For example, instead of having four SFCs 20, the switching domain 12B may have only two SFC chassis 20-1, 20-2, with each switch 18 using only two switch fabric ports 72 for communicating with the SFC chassis 20, one switch fabric port 72 for each of the two SFC chassis 20. This permutation of oversubscription has, for example, each switch 18 on its network side with an aggregate ingress 400 Gbps bandwidth (forty 10 Gbps Ethernet Ports) and an aggregate egress 240 Gbps cell-switching bandwidth on its two 120 Gbps switch fabric ports 72 for communicating with the two SFCs. Other oversubscription permutations can be practiced.

As an example, the server device 22 is coupled to one of the network-facing ports 68 of the switch 18-2. The cell-based switches 18 redirect management and control packets that they receive over their network ports 68 to the server device 22 for processing. In the other direction, the server device 22 sends management and control packets to the switches 18 for transmission out through their network ports 68. The protocol used by the server device 22 to process management and control packets for the switches 18 and SFCs 20 of the cell-based fabric system 12B is a different protocol from the M-DFP protocol used by the server device 22 to process management and control packets for the switches 14 of the packet-based distributed fabric system 12A. For example, in contrast to those of the packet-based distributed fabric system 12A, management and control packets in the cell-based fabric system 12B are not bridged (i.e., they do not hop across switches 18 to reach their destination, but are delivered directly to their local destination ports). To distinguish between the management and control packets of the different distributed fabric systems 12A, 12B, the management and control packets of the packet-based distributed fabric system 12A are referred to as M-DFP packets, whereas those of the cell-based distributed fabric system 12B are referred to as non-M-DFP packets.

Figure 5:
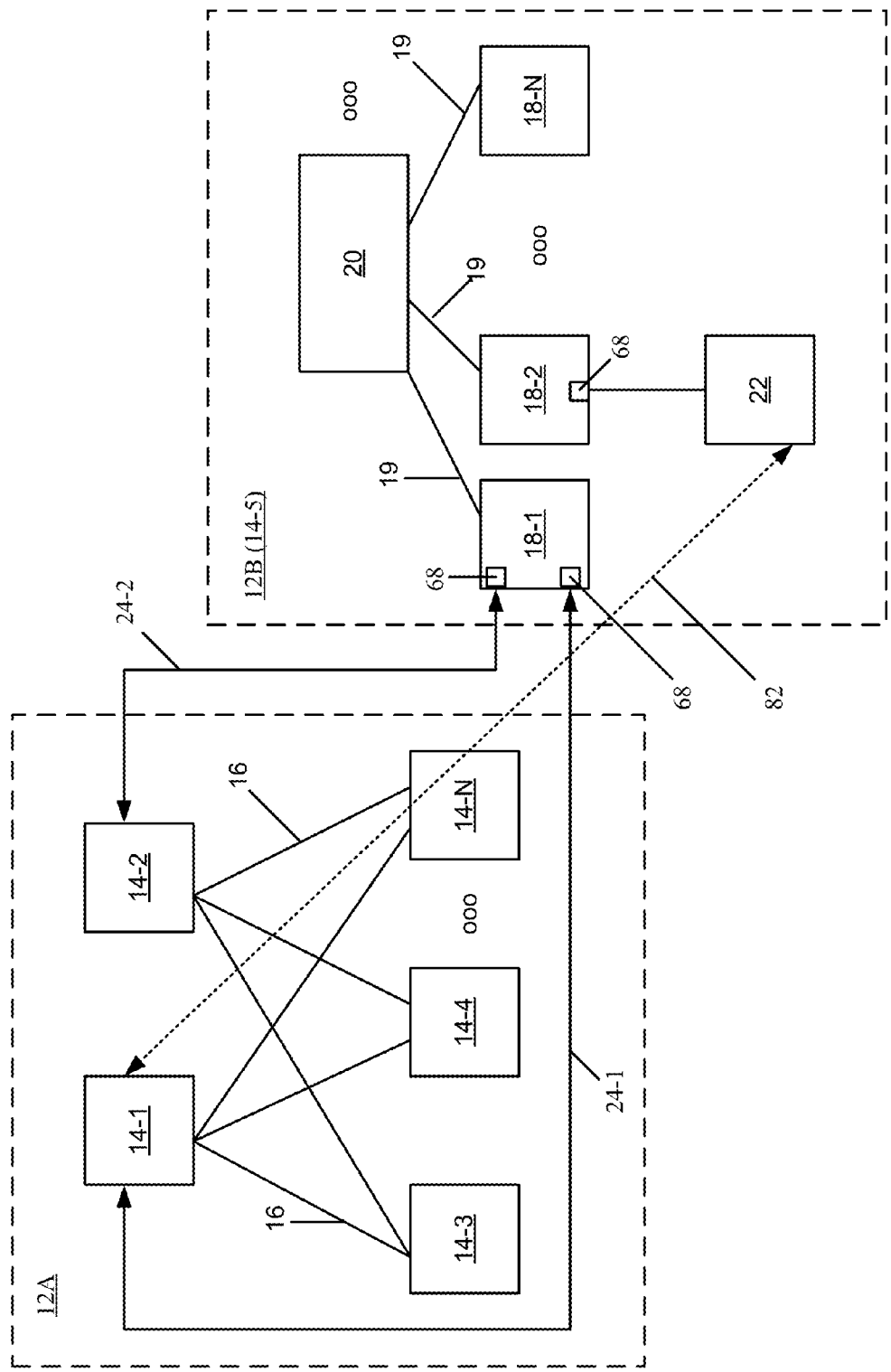
FIG. 5 is a block diagram illustrating the connectivity between the packet-based switching domain of FIG. 2 and the cell-based switching domain of FIG. 4.

FIG. 5 shows an embodiment of connectivity between the switching domains 12A, 12B. The master switch 14-1 and standby switch 14-2 of the switching domain 12A are each connected to different network ports 68 of one of the switches 18 (here, e.g., switch 18-1) of the cell-based switching domain 12B by a communication link 24. The master switch 14-1 and standby switch 14-2 may be connected to two different switches 18, without departing from the principles set forth herein. Such connectivity between the master switch 14-1 (and, optionally, the standby switch 14-2) enables remote management and control of the switching domain 12A from the server device 22. The server device 22 is connected to one of the network ports 68 of one of the cell-based switches 18 (here, e.g., 18-2) of the cell-based switching domain 12B. The server device 22 may be connected to more than one network port 68 on the same or on different cell-based switches 18. By virtue of this connectivity and of the configuration of the server device 22 with M-DFP logic (as described in FIG. 6), the cell-based switching domain 12B is, in effect, a virtual packet-based standalone switch 14-5 that is incorporated into the packet-based switching domain 12A, joining the other standalone switches 14 as part of the switch stack.

In FIG. 5, the master switch 14-1 has a master-follower relationship with the server device 22, wherein the master switch 14-1 is the master and the server device 22 is the follower. When the cell-based switching domain becomes active, the server device 22 acquires the appropriate switch information from the switches 18 and SFCs 20 and sends this information to the master switch 14-1. Based on this information, the master switch 14-1 generates a virtual slot for each switch 18 and SFC 20, adding these virtual slots to the stack of virtual slots generated for each of the standalone switches 14 discovered in the packet-based switching domain 12B. These switches 18 and SFCs 20 thus become incorporated into the packet-based switching domain 12A. Data packets can traverse from packet-based switches 14 to cell-based switches 18 and from cell-based switches 18 to packet-based standalone switches 14, typically passing through the SFCs 20.

Alternatively, the server device 22 may become master of the packet-based switching domain 12A, by election or by some other process, thereby reversing the direction of the master-follower relationship; that is, the server device 22 becomes master, and each of the switches 14-1 . . . 14-N are followers. As master of the packet-based switching domain 12A, which includes the cell-based switching domain 12B (also referred to by reference numeral 14-5), the server device 22 generates and maintains the virtual slots of the stacked switch corresponding to the packet-based switching domain 12A in response to the switch information acquired from the standalone follower switches 14-1 ... 14-N, from the cell-based switches 18, and from the SFCs 20. A dashed doubled-ended arrow 82 represents a virtual path by which the switch 14-1 sends M-DFP management and control packets to the server device 22 (irrespective of whether the switch 14-1 is in the role of master or follower).

Figure 6:
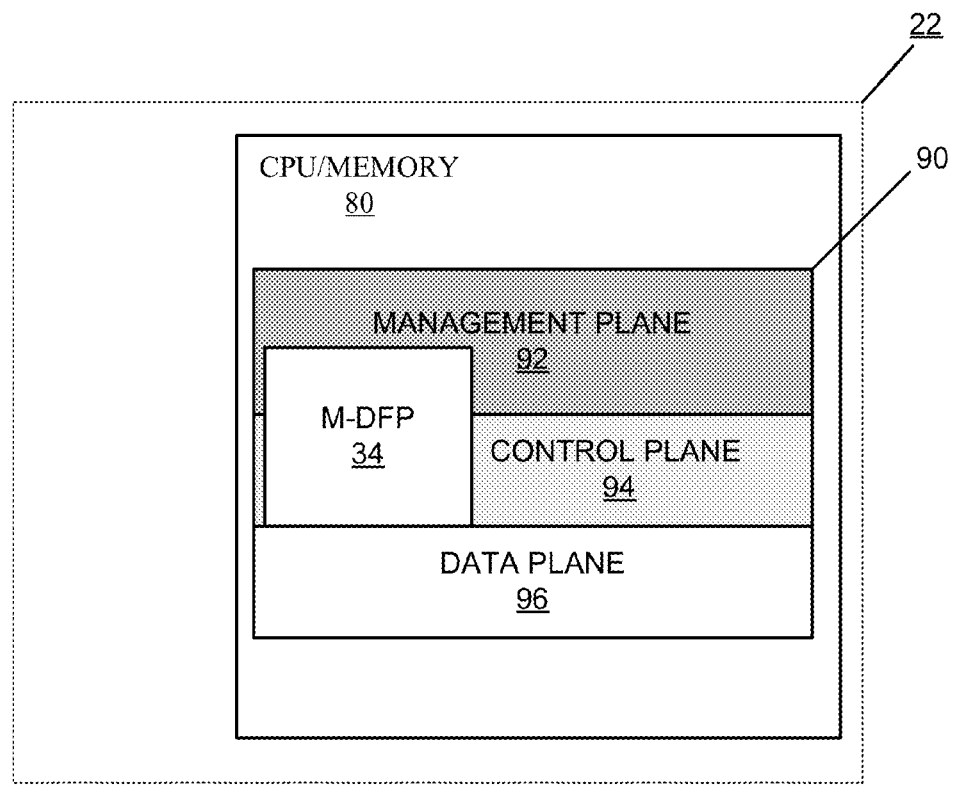
FIG. 6 is a functional block diagram of layered software in a server in communication with one of the switches of the cell-based switching domain of FIG. 4.

To provide a single management domain for the independent heterogeneous switching domains 12A, 12B, the server device 22 is configured with the appropriate logic, software, and/or protocols for communicating on the packet-based and cell-based switching domains 12A, 12B. FIG. 6 shows generally the logic, software, or protocol suite 90 of the server device 22, which includes management plane logic 92, control plane logic 94, and data plane logic 96 stored in a processor memory 80 of the server device 22. The management plane logic 92 and the control plane logic 94 include the M-DFP layered software or logic 34 (FIG. 3). The M-DFP logic 34 provides the server device 22 with M-DFP capabilities by which the server device 22 is able to establish a master-follower relationship with one of the standalone switches 14 of the packet-based switching domain 12A. With such M-DFP capabilities, the server device 22 and, thus, the cell-based switching domain 12B, are able to join the packet-based switching domain 12A, wherein the standalone switches 14, the cell-based switches 18, and the SFCs 20 are each a separate virtual slot in the switch stack. Accordingly, the cell-based switching domain 12B becomes a sub-part of the packet-based switching domain 12A, a virtual standalone switch within a distributed fabric of standalone switches, all under a single maintenance domain. The M-DFP logic 34 enables the server device 22 to process M-DFP management and control packets received from a standalone switch 14 of the packet-based switching domain 12A. An example implementation of a server that provides a remote control plane for a network element (and its standby network element) is described in U.S. patent application Ser. No. 13/237,143, titled "Systems and Methods for Controlling a Network Switch," the entirety of which is incorporated by reference herein.

The management plane logic 92 and control plane logic 94 of the server device 22 also enables the server device 22 to process non-M-DFP management and control packets, respectively, for the cell-based switches 18 and SFCs 20 of the switching domain 12B in accordance with a communication protocol that differs from the management distributed fabric protocol (M-DFP) of the packet-based switching domain 12A. In accordance with this communication protocol, management and control packets may be layer 2/layer 3 unicast or multicast packets. In one embodiment, the packet format of each non-M-DFP management and control packet includes an Ethernet header.

Figure 7:
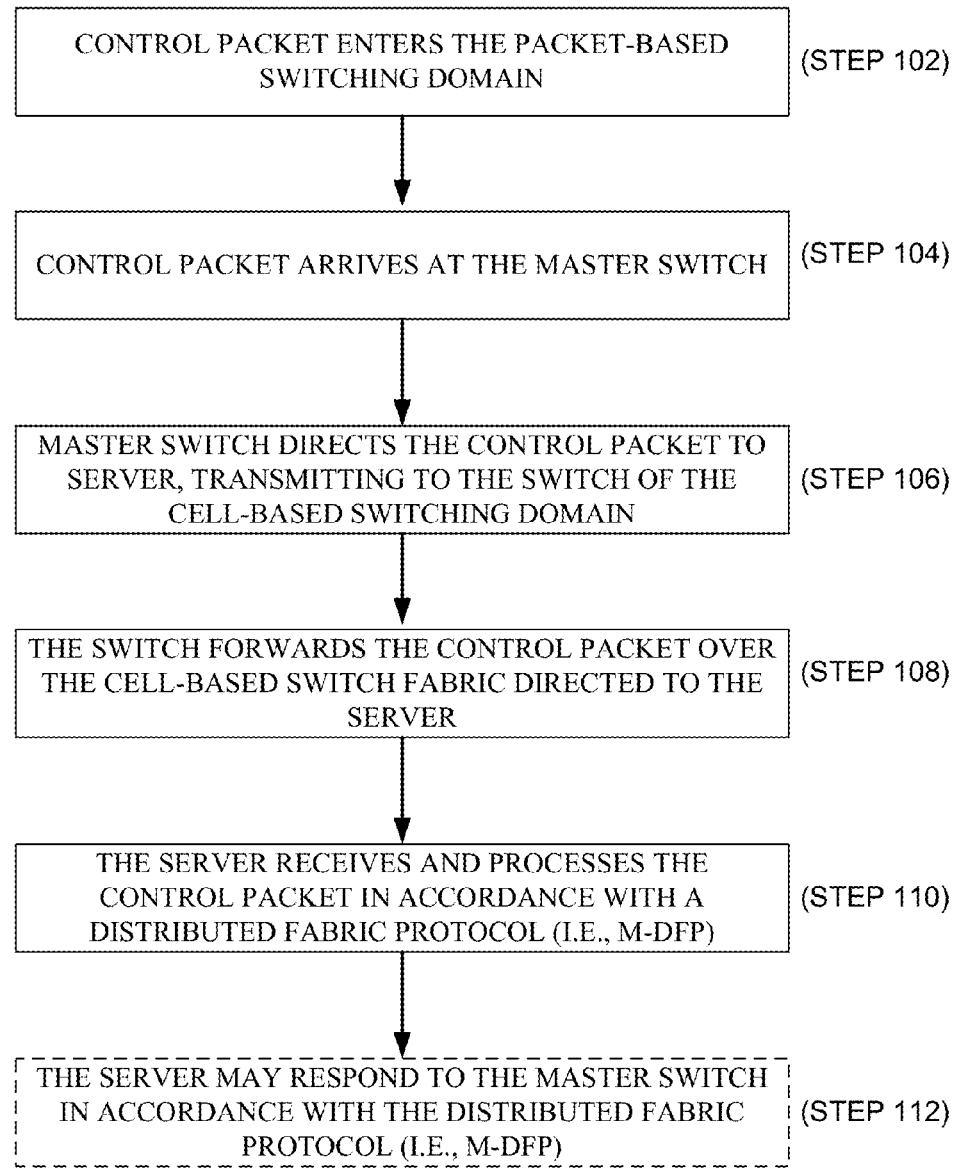
FIG. 7 is a flow diagram illustrating an embodiment of a process for implementing the control plane for a packet-based switching domain.

FIG. 7 shows an embodiment of a process 100 for implementing the control plane for a packet-based switching domain. In the description of the process 100, reference is made to elements of FIG. 4 and FIG. 5 for illustration purposes. Implementation of the management plane at the server device follows a similar process for handling M-DFP management packets. An M-DFP control packet enters (step 102) the packet-based switching domain 12A through one of the follower switches 14 (e.g., switch 14-3). By default, all switches of the packet-based switching domain 12A are configured to forward M-DFP control (and management) packets towards the server system 22 coupled to the cell-based switching domain 12B. The switch 14 sends (step 104) the M-DFP control packet to the master switch 14-1 for subsequent forwarding (step 106) to the server device 22 (or the M-DFP control packet may have entered the switching domain 12A initially at the master switch 14-1). The master switch 14-1 transmits the M-DFP control packet to the cell-based switch 18-1 (FIG. 6) of the cell-based switching domain 12 B (14-5) to which the master switch 14-1 is coupled. The cell-based switch 18-1 forwards (step 108) the M-DFP control packet to the server device 22 through the cell-based switch fabric 20, dividing the M-DFP control into cells and distributing the cells across the SFCs 20, as described in connection with FIG. 4.

The SFCs 20 forward the cells to the cell-based switch 18-2 to which the server device 22 is coupled. The cell-based switch 18-2 reassembles the M-DFP control packet from the received cells and forwards the reassembled M-DFP control packet to the server device 22. The server device 22 processes (step 110) the M-DFP control packet in accordance with the distributed fabric protocol (i.e., M-DFP) and may send a response (step 112) to the master switch 14-1 in accordance with the distributed fabric protocol. Such a response would pass to the cell-based switch 18-2, through the cell-based switch fabric, and to the cell-based switch 18-1, which forwards the response to the master switch 14-1 over the communication link 24.

Notably, the M-DFP control packet does not need to be transmitted over the cell-based switch fabric (i.e., divided into cells and reassembled into the M-DFP control packet) if the server device 22 is instead coupled to the cell-based switch 18-1 that receives the M-DFP control packet from the master switch 14-1. In addition, it is to be understood that in some embodiments the server device 22, instead of the master switch 14-1, can assume the role of master for the packet-based switching domain 12A.

Figure 8:
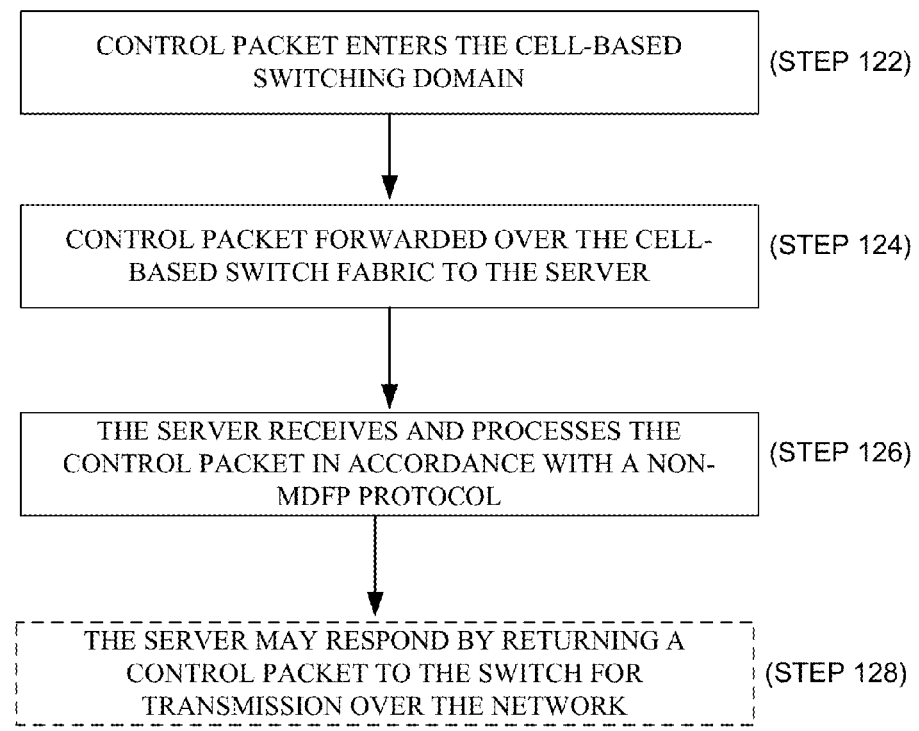
FIG. 8 is a flow diagram illustrating an embodiment of a process for implementing a centralized control plane for a cell-based switching domain.

FIG. 8 shows an embodiment of a process 120 for implementing a centralized control plane for the cell-based switching domain 12B. In this description of the process 120, reference is made to elements of FIG. 4 and FIG. 5 for illustration purposes. The process 120 runs concurrently with the process 100 described in connection with FIG. 7 (i.e., while the cell-based switching domain 12B is part of the packet-based switching domain 12A. Implementation of the management plane at the server device 22 follows a similar process for handling non-M-DFP management packets. This concurrent administration of the control and management planes at the server device 22 operates to bring the multiple different switching domains 12A, 12B under a single management domain.

At step 122, a non-M-DFP control packet enters the cell-based switching domain 12B through a network port 68 of one of the cell-based switches 18 (e.g., switch 18-N). That cell-based switch 18-N redirects (step 124) the non-M-DFP control packet over the cell-based switch fabric to the server device 22 (more precisely, to the cell-based switch 18-2 to which the server 22 is coupled). The non-M-DFP control packet is divided into cells, distributed across the SFCs 20, and reassembled at the cell-based switch 18-2 (i.e., the switch 18 coupled to the server device 22). The cell-based switch 18-2 sends (step 126) the non-M-DFP control packet to the server device 22, which processes the non-M-DFP control packet in accordance with a protocol (i.e., different from the M-DFP used for M-DFP control packets). This protocol can be a proprietary or standard protocol. At step 128, the server device 22 may respond by returning a control packet to the source cell-based switch 18-N for transmission, for example, out through a network port 68 and over the network 8.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A network comprising:
a first switching domain having a distributed fabric comprised of a plurality of interconnected standalone switches, the standalone switches communicating with each other in accordance with a packet-based distributed fabric protocol; and
a second switching domain having a plurality of cell-based switches in communication with a cell-based switch fabric, the cell-based switches of the second switching domain communicating with each other through the cell-based switch fabric in accordance with a cell-based distributed fabric protocol, a given one of the cell-based switches of the second switching domain being coupled by a communication link to a given one of the standalone switches of the first switching domain, the second switching domain further comprising a server device coupled to one of the cell-based switches in the second switching domain, the server device being configured with logic to process control packets for the standalone switches of the first switching domain in accordance with the packet-based distributed fabric protocol and control packets for the cell-based switches of the second switching domain in accordance with a protocol that is different from the packet-based distributed fabric protocol.

2. The network of claim 1, wherein the standalone switches of the first switching domain includes a master switch and a plurality of follower switches, and the logic on the server device enables the second switching domain to join as a virtual follower switch to the first switching domain.

3. The network of claim 2, wherein each cell-based switch of the second switching domain occupies a different virtual slot of the first switching domain.

4. The network of claim 1, wherein the logic on the server device enables the server device to operate as a master for the first switching domain with the standalone switches operating as follower switches.

5. The network of claim 4, wherein the server device assigns a different one of the virtual slots to each standalone switch of the first switching domain, to each cell-based switch of the second switching domain, and to each switch fabric element of the second switching domain, to produce a virtual switch stack.

6. The network of claim 1, wherein the server device is further configured with logic to process management packets for the standalone switches of the first switching domain in accordance with the packet-based distributed fabric protocol and management packets for the cell-based switches of the second switching domain in accordance with the protocol that is different from the packet-based distributed fabric protocol.

7. The network of claim 1, wherein, to arrive at the server device, control packets for the first switching domain pass through the given one of the cell-based switches of the second switching domain, through the cell-based switch fabric, and through the cell-based switch to which the server device is coupled.

8. The network of claim 1, wherein the given one of the standalone switches of the first switching domain to which the given one of the cell-based switches of the second switching domain is coupled is a first standalone switch and wherein the given one of the cell-based switches of the second switching domain is coupled by a second communication link to a second standalone switch of the first switching domain.

9. The network of claim 8, wherein the first standalone switch is a master switch of the first switching domain and the second standalone switch is a standby switch of the first switching domain, the standby switch being configured to assume a role of the master switch if the master switch becomes unavailable.

10. A server computing system comprising:
memory storing program code for providing control plane functionality for a first switching domain comprised of a plurality of interconnected standalone packet-based switches that communicate with each other in accordance with a packet-based distributed fabric protocol and program code for providing control plane functionality for a second switching domain having a plurality of cell-based switches that communicate with each other through a cell-based switch fabric in accordance with a cell-based distributed fabric protocol; and
a processor executing the program code stored in the memory to process control packets for the standalone switches of the first switching domain in accordance with the packet-based distributed fabric protocol and control packets for the cell-based switches of the second switching domain in accordance with a protocol different from the packet-based distributed fabric protocol.

11. The server computing system of claim 10, wherein the standalone switches of the first switching domain includes a master switch and a plurality of follower switches, and the program code stored in the memory, when executed, causes the second switching domain to join the first switching domain as a virtual follower switch.

12. The server computing system of claim 11, wherein the program code, when executed, configures the server computing system to acquire information about the cell-based switch fabric and about each cell-based switch of the second switching domain, and to transmit the collected information to the master switch of the first switching domain.

13. The server computing system of claim 10, wherein the program code, when executed, configures the server computing system to operate as a master for the first switching domain, with the standalone switches of the first switching domain operating as follower switches.

14. The server computing system of claim 13, wherein the program code, when executed, configures the server computing system to assign a different one of the virtual slots to each standalone switch of the first switching domain, to each cell-based switch of the second switching domain, and to each switch fabric element of the second switching domain, to produce a virtual switch stack.

15. The server computing system of claim 10, wherein the program further comprises program code that, when executed, configures the server computing system to process management packets for the standalone switches of the first switching domain in accordance with the packet-based distributed fabric protocol and management packets for the cell-based switches of the second switching domain in accordance with the protocol that is different from the packet-based distributed fabric protocol.

16. A method for centralizing control plane functionality for heterogeneous switching domains, the method comprising:
configuring a server device with logic for processing control packets for standalone switches of a first switching domain in accordance with a packet-based distributed fabric protocol and with logic for processing control packets for cell-based switches of a second switching domain in accordance with a protocol that is different from the packet-based distributed fabric protocol;
coupling the server device to a cell-based switch of the cell-based switching domain;
processing, by the server device, control packets for the standalone switches of the first switching domain in accordance with the packet-based distributed fabric protocol; and
processing, by the server device, control packets for the cell-based switches of the second switching domain in accordance with the protocol that is different from the packet-based distributed fabric protocol.

17. The method of claim 16, further comprising joining the first switching domain, by the second switching domain, as a virtual follower switch.

18. The method of claim 17, further comprising acquiring, by the server device, information about the cell-based switch fabric and about each cell-based switch of the second switching domain, and transmitting the collected information to a master switch of the first switching domain.

19. The method of claim 16, further comprising joining the first switching domain, by the second switching domain, as a master, with the standalone switches of the first switching domain operating as follower switches.

20. The method of claim 19, further comprising assigning, by the server device, a different virtual slot to each standalone switch of the first switching domain, to each cell-based switch of the second switching domain, and to each switch fabric element of the second switching domain, to produce a virtual switch stack.

21. The method of claim 16, further comprising:
processing, by the server device, management packets for the standalone switches of the first switching domain in accordance with the packet-based distributed fabric protocol; and
processing, by the server device, management packets for the cell-based switches of the second switching domain in accordance with the protocol that is different from the packet-based distributed fabric protocol.

22. A computer program product for execution by a server device to provide control plane and management plane functionality for different heterogeneous switching domains, the computer program product comprising:
a non-transitory computer-readable storage medium having computer-readable program code embodied therewith, the computer-readable program code comprising:
computer-readable program code configured to enable the server device to process control packets for standalone switches of a first switching domain in accordance with a packet-based distributed fabric protocol used by the standalone switches to communicate in the first switching domain; and
computer-readable program code configured to enable the server device to process control packets arriving from cell-based switches of a second switching domain in accordance with a protocol that is different from the packet-based distributed fabric protocol.

23. The computer program product of claim 22, further comprising computer-readable program code configured to enable the second switching domain to join the first switching domain as a virtual follower switch.

24. The computer program product of claim 22, further comprising computer-readable program code configured to enable the second switching domain to join the first switching domain as a virtual master switch, with the standalone switches of the first switching domain operating as follower switches.

25. The computer program product of claim 22, further comprising:
computer-readable program code configured to enable the server device to process management packets for the standalone switches of the first switching domain in accordance with the packet-based distributed fabric protocol; and
computer-readable program code configured to enable the server device to process management packets for the cell-based switches of the second switching domain in accordance with the protocol that is different from the packet-based distributed fabric protocol.

* * * * *